(12) United States Patent
Hamada et al.

(10) Patent No.: US 6,325,736 B1
(45) Date of Patent: Dec. 4, 2001

(54) COUPLING DEVICE BETWEEN LEFT AND RIGHT WHEELS OF VEHICLE

(75) Inventors: Tetsuro Hamada; Kentaro Arai; Yoshihiro Kanamaru; Isamu Hashizume, all of Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 52 days.

(21) Appl. No.: 09/614,458

(22) Filed: Jul. 12, 2000

Related U.S. Application Data

(62) Division of application No. 09/441,232, filed on Nov. 16, 1999, now Pat. No. 6,105,704, which is a division of application No. 08/836,412, filed as application No. PCT/JP96/02259 on Aug. 9, 1996, now Pat. No. 6,024,182, application No. 09/614,458, which is a division of application No. 08/836,412.

(30) Foreign Application Priority Data

Sep. 11, 1995 (JP) .................................................. 7-232843
Sep. 11, 1995 (JP) .................................................. 7-232844

(51) Int. Cl.⁷ .................................................. B62D 11/06
(52) U.S. Cl. .......................... 475/18; 475/150; 475/221; 180/6.44
(58) Field of Search .......................... 475/18, 150, 153, 475/221, 225; 180/6.44, 6.66

(56) References Cited

U.S. PATENT DOCUMENTS

| | | | |
|---|---|---|---|
| 799,245 | 9/1905 | Lemp | 290/14 |
| 1,083,730 | 1/1914 | Collischonn | 290/14 |
| 1,984,830 | 12/1934 | Higley | 475/21 |
| 2,780,299 | 2/1957 | Matson | 180/6.28 |
| 3,027,780 | * 4/1962 | Storer, Jr. et al. | 475/18 |
| 3,698,498 | * 10/1972 | Stanford | 475/221 |
| 3,799,284 | 3/1974 | Hender | 180/65.2 |
| 4,732,053 | * 3/1988 | Gleasman et al. | 475/221 |
| 4,762,022 | 8/1988 | Johnshoy | 475/221 |
| 4,776,236 | * 10/1988 | Gleasman et al. | 475/18 |
| 4,817,460 | 4/1989 | Reed | 180/6.44 |
| 4,917,200 | 4/1990 | Lucius | 180/6.2 |
| 5,465,806 | 11/1995 | Higasa | 180/165 |
| 5,540,299 | 7/1996 | Tohda | 180/243 |
| 5,989,142 | * 11/1999 | Stazler | 475/150 |

FOREIGN PATENT DOCUMENTS

| | | |
|---|---|---|
| 63-82630 | 5/1988 | (JP) . |
| 5-131855 | 5/1993 | (JP) . |
| 5-299362 | 9/1993 | (JP) . |
| 6-293226 | 10/1994 | (JP) . |

* cited by examiner

*Primary Examiner*—Sherry Estremsky
(74) *Attorney, Agent, or Firm*—Armstrong, Westerman, Hattori, McLeland & Naughton, LLP

(57) ABSTRACT

This is a connecting device (7) to be interposed between left and right wheels (5L, 5R) of a vehicle. There are provided: a differential gear (8) having a first rotational element (8a), and second and third rotational elements (8b, 8c). The third rotational element (8c) is coupled to one (5R) of the rear wheels via the first power transmission system (10), and the second rotational element (8b) is coupled to the other (5L) of the rear wheels via second and third power transmission systems (11, 12). The gear ratios of both the first and second power transmission systems (10, 11) are identically set, and the gear ratio of the third power transmission system (12) is set so as to be opposite in direction to, but be equal in absolute value to, the above-mentioned gear ratio.

6 Claims, 12 Drawing Sheets

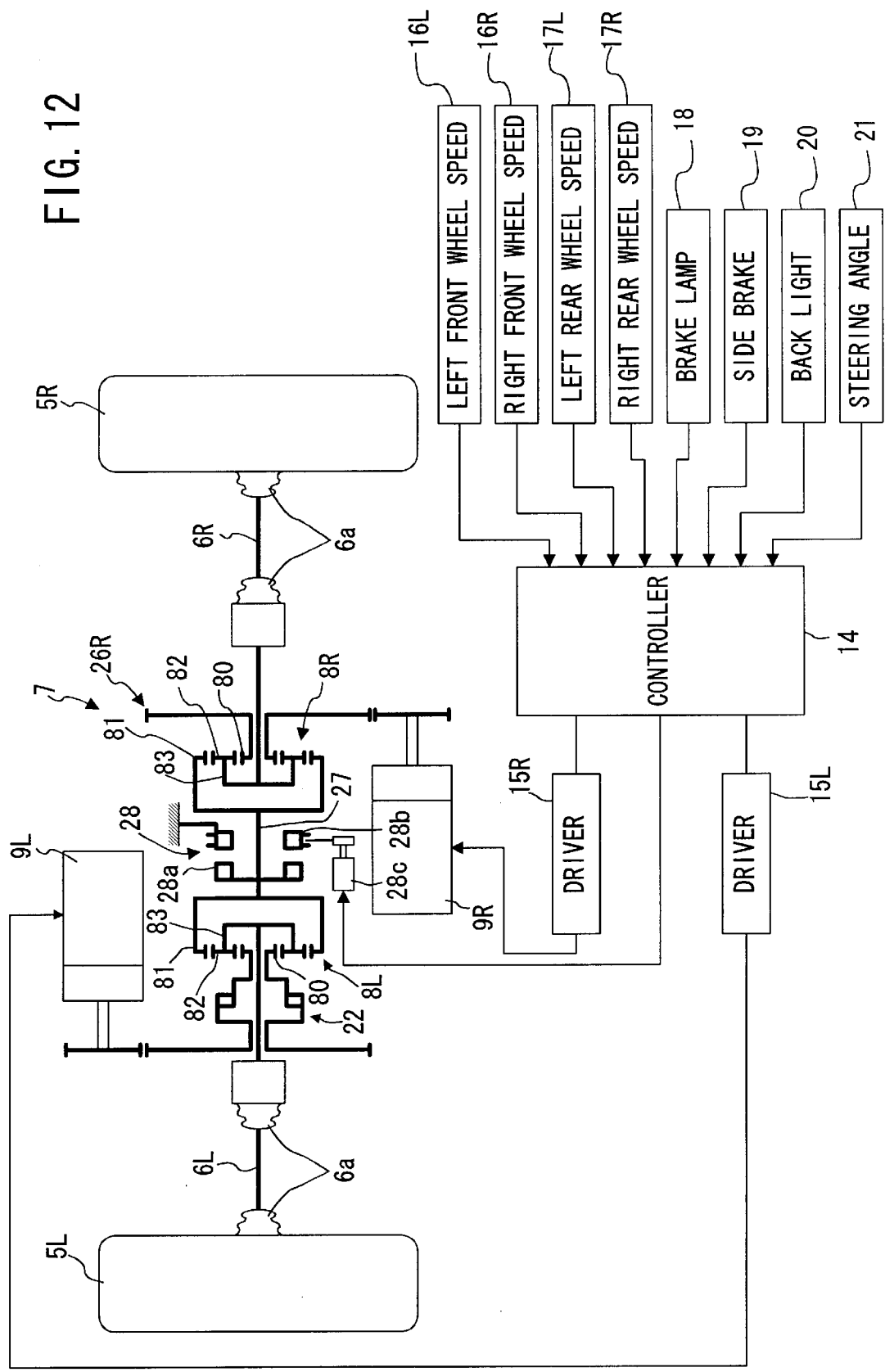

COUPLING DEVICE BETWEEN LEFT AND RIGHT WHEELS OF VEHICLE

This application is a Division of Ser. No. 08/836,482 filed Apr. 25, 1997 U.S. Pat. No. 6,824,182, and is a Division of Ser. No. 09/441,252 filed Nov. 16, 1999 now U.S. Pat. No. 6,105,704, which is a Division of Ser. No. 08/826,412 filed Apr. 25, 1997 now U.S. Pat. No. 6,024,182, which is a 371 of PCT/JP 96/82259 filed Aug. 9, 1996.

TECHNICAL FIELD

The present invention relates to a coupling device to be provided between left and right wheels of a vehicle, in particular between the left and right idler wheels that are not driven by an engine.

BACKGROUND ART

Conventionally, as this kind of coupling device, there is known, in Published Unexamined Patent Application No. 131855/1993, a coupling device in which: between the left and right wheels there are provided a first coupling passage which transmits the rotation of one of the left and right wheels to the other thereof with increasing speed, and a second-coupling passage which transmits the rotation of one of the wheels to the other thereof with decreasing speed; in both the coupling passages a clutch is interposed respectively; and at the time of cornering when one of the wheels becomes an inner wheel, the clutch for the first coupling passage is engaged, and at the time of cornering when one of the wheels becomes an outer wheel, the clutch for the second coupling passage is engaged so that the outer wheel is positively speeded up as compared with the inner wheel. In this manner, by generating a braking force on the inner wheel side and a driving force on the outer wheel side, the cornering performance is sought to be improved.

By the way, at the time of starting on a slippery road such as on a snowy road or the like, it is being considered to perform a starting assistance by driving the idler wheels by a driving source such as an electric motor or the like. It is desired to obtain a starting assistance function in addition to the above-described cornering control function in that the cornering performance is improved by generating a difference rotation between the left and right wheels.

The present invention has an object of providing a compact and inexpensive coupling device which meets the above-described desire and in which a difference rotation between the right and left wheels can be generated by utilizing the driving source for the starting assistance.

DISCLOSURE OF INVENTION

In order to solve the above-described problem, according to a first feature of the present invention, a coupling device to be provided between left and right wheels of a vehicle is arranged to comprise: a differential gear having a first rotational element, and second and third rotational elements one of which rotates in normal direction while the other thereof rotates in reverse direction, respectively, relative to the first rotational element; a driving source which is coupled to the first rotational element of the differential g ear; a first power transmission system which couples the second rotational element to one of the left and right wheels; and a pair of second and third power transmission systems which are selectively established via switching means and which couple the third rotational element to the other of the left and right wheels; wherein gear ratios of the first power transmission system and the second power transmission system are both set to an identical first gear ratio; and wherein a gear ratio of the third power transmission system is set to a second gear ratio which is different from the first gear ratio.

At the time of starting of the vehicle, the driving source is rotated in normal direction or in reverse direction in a state in which the s econd power transmission system is established. According to this arrangement, the driving force is equally transmitted from the differential gear to the left and right wheels via the first and second power transmission systems of the mutually identical gear ratio. The left and right wheels are both rotated either in normal direction or in reverse direction, whereby the starting assistance for forward running or reverse running is performed.

After starting, the third power transmission system is established and also the driving source is stopped. In this case, if the second gear ratio that is the gear ratio of the third power transmission system is set so as to be opposite in direction to, but be equal in absolute value to, the gear ratio of the first power transmission system, the first rotational element of the differential gear will cease to rotate as long as the left and right wheels are rotating at the same speed. Therefore, when the rotation of the first rotational element is restricted by braking the driving source, the differential limiting between the left and right wheels is performed, whereby the straight-running stability is improved.

Further, when the diving source is rotated in normal direction in a state in which the third power transmission system is established, one of the left and right wheels is speeded up relative to the other thereof and, when the driving source is rotated in the reverse direction, said the other of the left and right wheels is speeded up relative to said one of the left and right wheels. Therefore, if the driving source is rotated in normal direction or reverse direction such that the wheel which becomes an outer wheel at the time of cornering is speeded up, a driving force is added to the outer wheel and a braking force is added to the inner wheel, whereby a yawing moment in the cornering direction is generated, resulting in an improvement in the cornering performance.

In the above-described arrangement, the number of the differential gear is selected to be one and the second and third power transmission systems are selectively established. However, a similar function can also be obtained by using two differential gears. Therefore, according to a second feature of the present invention, a coupling device to be provided between left and right wheels of a vehicle, is arranged to comprise: a pair of first and second differential gears each having a first rotational element, and second and third rotational elements one of which rotates in normal direction while the other thereof rotates in reverse direction, respectively, relative to the first rotational element; a driving source which is selectively coupled via switching means to the first rotational element of the first differential gear and to the first rotational element of the second differential gear; wherein the second rotational element and the third rotational element of the first differential gear are coupled at a first gear ratio to one and the other, respectively, of the left and right wheels; wherein the second rotational element of the second differential gear is coupled to one of the left and right wheels at a second gear ratio; and wherein the third rotational element of the second differential gear is coupled to said the-other of the left and right wheels at a third gear ratio which is different from the second gear ratio.

In this arrangement, when the driving source is coupled to the first rotational element of the first differential gear, the same state is attained as at the time when the second power transmission system is established in the above-described first feature. If the driving source is rotated in normal or reverse direction in this state at the time of starting, the driving force is equally transmitted to the left and right wheels, whereby the starting assistance for forward running or reverse running is performed.

Further, when the driving source is coupled to the first rotational element of the second differential gear, the same state is attained as at the time when the third power transmission system is established in the above-described first feature. Then, if the third gear ratio is set so as to be opposite in direction to, but be equal in absolute value to, the second gear ratio, the first rotational element of the second differential gear will not rotate as long as the left and right wheels are rotating at the same speed. Therefore, if the rotation of the first rotational element of the second differential gear is restricted by braking the driving source, the differential limiting between the left and right wheels is performed, whereby the straight-running stability is improved. Further, at the time of cornering, the outer wheel is speeded up by rotating the driving source in normal or reverse direction to improve the cornering performance.

As described above, according to the present invention, in either of the first feature and the second feature, there can be obtained a compact and inexpensive coupling device which can perform the starting assistance control, the cornering control, and further the differential limiting control by an organic combination of the differential gear and the driving source. In particular, since an arrangement is made such that the difference rotation-between the left and right wheels is taken out by the differential gear, the rotation speed required for the cornering control and the differential limiting control becomes low. Therefore, even if the output torque of the driving source is small, the torque required for the cornering control and the differential limiting control can be obtained by performing a sufficient speed reduction. Consequently, the driving source can be made smaller, and it becomes compact.

By the way, in a state in which the third power transmission system is established in the first feature, and in a state in which the driving source is coupled to the first rotational element of the second differential gear in the second feature, if there occurs a difference rotation between the left and right wheels, the first rotational element of the differential gear (the second differential gear in the second feature) rotates at a speed corresponding to the difference rotation, whereby the driving source is driven in inverse manner. It follows that, if an excessive difference rotation occurs between the left and right wheels due, for example, to locking of one wheel at the time of braking, or the like, the driving source will rotate excessively to thereby impair the durability of the driving source.

In this case, if there is provided clutch means which releases the coupling between the left and right wheels or the coupling between the differential gear (both the first and second differential gears in the second feature) and the driving source when the difference rotation between the left and right wheels has exceeded a predetermined value, an excessive rotation of the driving source due to the excessive difference rotation can be prevented. This is advantageous in improving the durability of the driving source.

By the way, if the switching means in the first feature is arranged to be switchable to a neutral state in which neither of the second and third power transmission systems is established, and if the switching means in the second feature is arranged to be switchable to a neutral state in which the driving source is coupled to neither of the first rotational element of one of the differential gears and the first rotational element of the other of the differential gears such that the switching means is switched to the neutral state when the difference rotation between the left and right wheels has exceeded a predetermined value, the excessive rotation of the driving source can be prevented even if the clutch means is not separately provided.

By the way, in the above-describe first and second features, the driving source is selected to be one in number. According to a third feature of the present invention, a coupling device to be provided between left and right wheels of a vehicle is arranged to comprise: a pair of differential gears each having first, second, and third rotational elements; and a pair of driving sources each being respectively coupled to the first rotational element of each of the differential gears; wherein the second rotational element of each of the differential gears is coupled to each of the left and right wheels; wherein the third rotational elements of both the differential gears are coupled to each other; and wherein brake means which is capable of restricting the rotation of the third rotational element is provided.

At the time of starting the vehicle, the brake means is operated and also both the driving sources are rotated both in the normal direction or in the reverse direction. According to this arrangement, the third rotational elements of both the differential gears function as reaction force receivers. The driving forces of both the driving sources are transmitted to the second rotational elements via the first rotational elements of both the differential gears, whereby the left and right wheels are rotated both in the normal direction or in the reverse direction, and the starting assistance in the forward running or reverse running is performed.

After starting, the brake means is released and also both the driving sources are stopped. In this case, if both the driving sources are kept braked, the first rotational elements of both the differential gears operate as reaction force receivers, and a state is attained in which the left and right wheels are directly coupled to each other via the second rotational element and the third rotational element of both the differential gears. The difference rotation between the left and right wheels is thereby restricted and the straight running stability is improved.

Further, at the time of cornering, the driving source to be connected to the differential gear on the side of the wheel that becomes the outside wheel is rotated in the normal direction and the driving source to be connected to the differential gear on the side of the wheel that becomes the inside is rotated in the reverse direction. According to this arrangement, the outside wheel is speeded up and also the inside wheel is retarded, whereby the cornering performance is improved.

As described above, also in the third feature, by an organic combination of the differential gear and the driving source, there can be obtained a compact and inexpensive coupling device in which the starting assistance control and the cornering control and further the differential limiting control can be performed. Particularly, since an arrangement is made such that the difference rotation between the left and right wheels is taken out by the differential gears, the rotation speed required for the cornering control and the differential limiting control becomes small. Therefore, even if the output torque of the driving source is small, the torque required for the cornering control and the differential limiting control can be obtained by performing a sufficient speed reduction. Consequently, the driving source can be made small, and it becomes compact.

By the way, in order not to generate a rotational speed difference between the front and rear wheels, it is desirable to make uniform the average speed-of the inner and outer wheels by making equal the speeding-up amount of the outer wheel and the retardation amount of the inner wheel. In this case, if the dimensions of each of the rotational elements of both the differential gears are respectively made equal to each other, the speeding-up amount of the outer wheel and the retardation amount of the inner wheel can be made equal to each other simply by rotating one of the driving sources and the other of the driving sources in the normal direction and the reverse direction at an equal speed. There is therefore an advantage in that the control of the driving sources becomes easy.

Further, it is also considered: to constitute each of the differential gears by a bevel gear type of differential gear in which a pair of side gears made up of bevel gears and a pinion to be engaged with both the side gears are rotatably supported on a differential case; and to use the differential case, one of the side gears, and the other of the side gears, respectively, as the above-described first, second, and third rotational elements. However, in this arrangement, if the differential case which serves as the first rotational element is rotated by the driving source in a state in which the rotation of said the other of the side gears which serves as the third rotational element is restricted by the brake means, said one of the side gears which serves as the second rotational element is rotated by being speeded up, whereby the driving torque to be transmitted to the wheels at the time of starting is lowered. Even in case the differential case is arranged to be the third rotational element and said the other of the side gears is arranged to be the first rotational element, said one of the side gears which serves as the second rotational element will be rotated at the same rotational speed as the first rotational element. Therefore, in order to obtain the driving torque required for the starting assistance, either a driving source having a larger output torque must be used as the driving source, or a reduction gear having a larger reduction gear ratio must be separately added.

On the contrary, if each of the differential gears is constituted by a planetary gear type of transmission comprising a sun gear, a ring gear, and a carrier for supporting a planetary gear to be engaged with both the sun gear and the ring gear, and if the sun gear is used as the first rotational element, and the carrier is used as the second rotational element, and the ring gear is used as the third rotational element, when the sun gear which serves as the first rotational element is driven by the driving source in a state in which the rotation of the ring gear which serves as the third rotational element is restricted by the brake means, the carrier which serves as the second rotational element will be rotated at a lower speed in a predetermined reduction gear ratio. Therefore, as the driving source a smaller one having a smaller output torque can be used. In addition, even in case a reduction gear is added, a reduction gear having a smaller reduction gear ratio will suffice, which is advantageous.

By the way, when an excessive difference rotation occurs between the left and right wheels due, for example, to the locking of one wheel at the time of braking, or the like, the driving source will be driven in inverse manner at a speed corresponding to this difference rotation, whereby the durability of the driving source is impaired. In this case, if there is provided clutch means which releases the coupling between the left and right wheels or the coupling between at least one of both the differential gears and the corresponding one of the driving sources when a difference rotation between the left and right wheels has exceeded-a predetermined value, the driving in inverse manner of the driving source due to the difference rotation is prevented. This is advantageous in improving the durability of the driving source.

BRIEF DESCRIPTION OF DRAWINGS

FIG. 12 is a skeleton diagram showing an eighth embodiment of the device of the present invention.

BEST MODE FOR CARRYING OUT THE INVENTION

Figure 1:
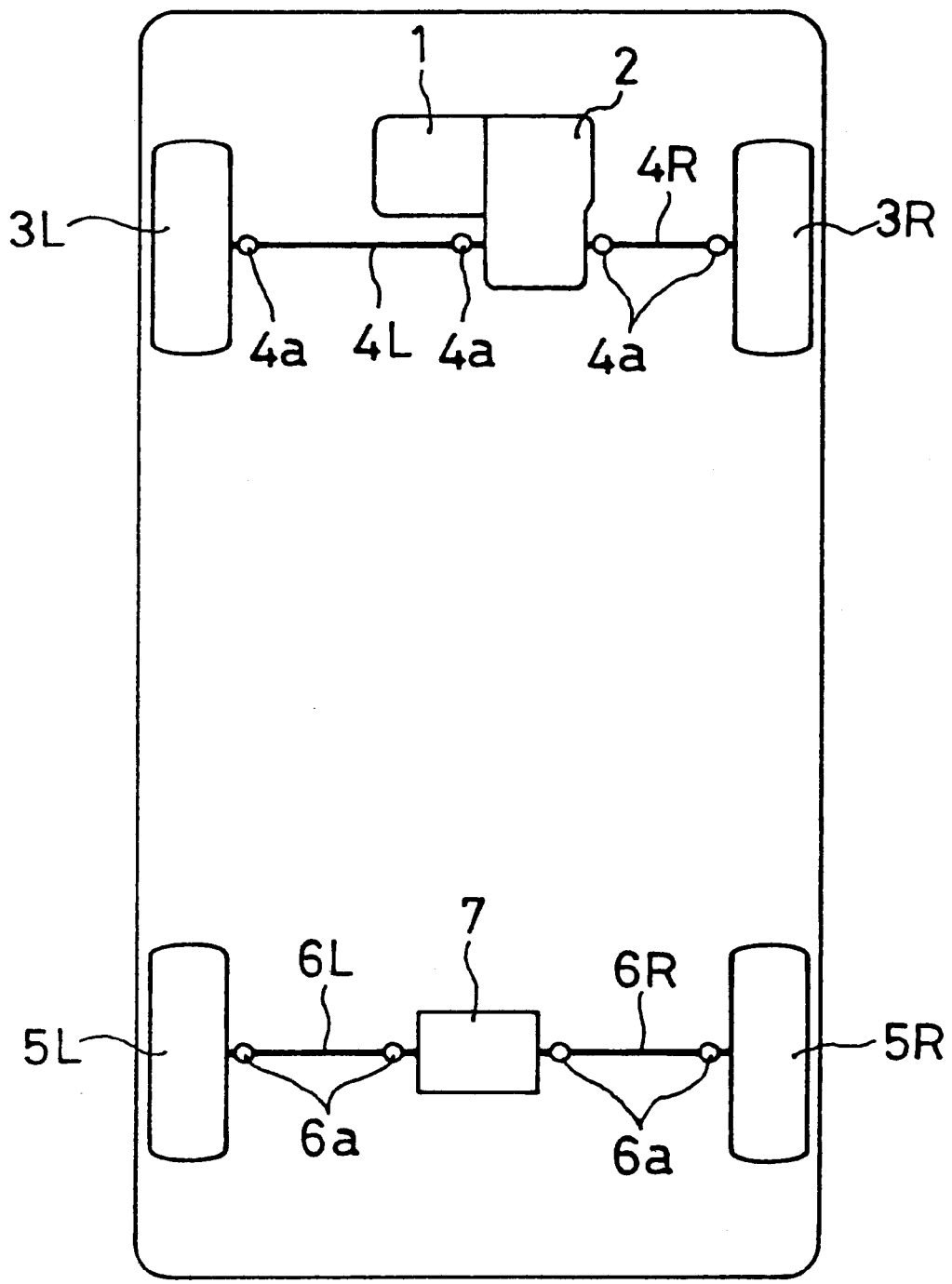
FIG. 1 is a diagram showing an example of using the device of the present invention.

FIG. 1 shows a front-wheel-drive vehicle in which the left and right front wheels 3L, 3R are driven by an engine 1 via a transmission 2. Each of the front wheels 3L, 3R is coupled to the transmission 2 via each drive shaft 4L, 4R which has respectively constant velocity joints 4a on both ends.

To the left and right rear wheels 5L, 5R, which are idler wheels, there are connected coupling shafts 6L, 6R which have respectively constant velocity joints 6a on both ends, and a coupling device 7 is interposed between both the coupling shafts 6L, 6R.

Figure 2:
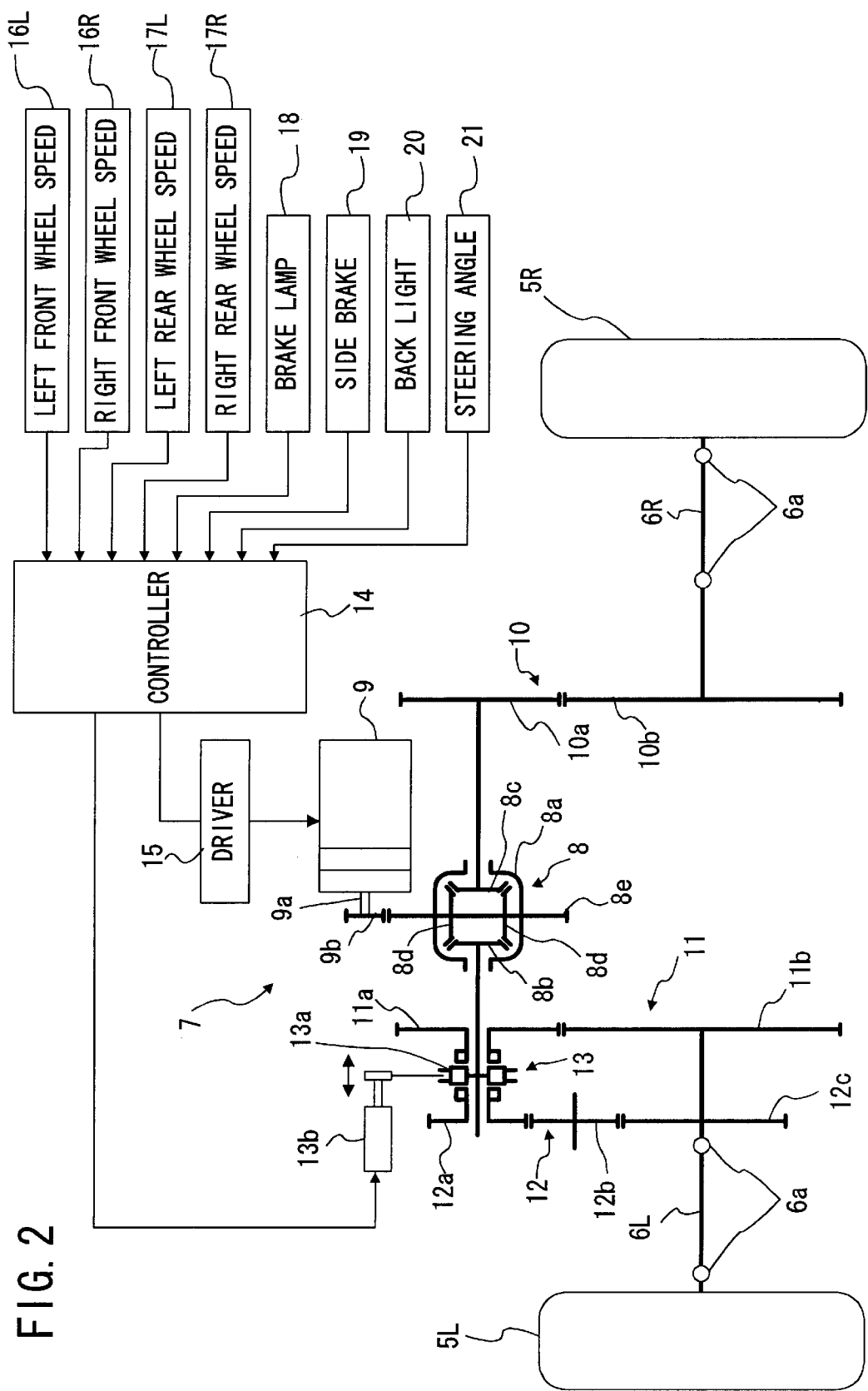
FIG. 2 is a skeleton diagram showing a first embodiment of the device of the present invention.

The coupling device 7 is provided, as shown in FIG. 2, with a differential gear 8 and a driving source 9. The differential gear 8 is constituted by a bevel gear type of differential gear which is made up by rotatably supporting, on a differential gear case 8a, a pair of left and right side gears 8b, 8c comprising bevel gears, and a pair of pinions 8d which are geared with both the side gears 8b, 8c. And a gear 9b on an output shaft 9a of the driving source 9 is geared with a ring gear Be which is fixed to the differential gear case 8a, to thereby couple the driving source 9 to the differential gear case 8a. Also, one of the left and right side gears, e.g., the side gear 8c on the right side, is coupled to the constant velocity joint 6a on the coupling shaft 6R for the right rear wheel 5R via a first power transmission system 10. Further, the side gear 8b on the left side is coupled to the constant velocity Joint 6a on the coupling shaft 6L for the left rear wheel 5L via second and third power transmission systems 11, 12 which are selectively established via a switching means 13.

The first and second power transmission systems 10, 11 are constituted by gear trains which are made up of driving gears 10a, 11a and driven gears 10b, 11b. The gear ratios of both the power transmission systems 10, 11 are set to a mutually identical first gear ratio r1. The third power transmission system 12 is constituted by a gear train which is made up of a driving gear 12a, an intermediate idle gear 12b, and a driven gear 12c. Its gear ratio is set to a second gear ratio r2 (=−r1) that is opposite in direction to, but is equal in absolute value to, the first gear ratio r1.

By the way, the following arrangement may also be employed. Namely, the differential gear 8 is constituted by a planetary type of differential gear comprising a sun gear, a ring gear, and a carrier for supporting a pinion which is geared with both the sun gear and the ring gear, and the driving source 9 is connected to the carrier. And one of the sun gear and the ring gear, e.g., the sun gear is connected to one of the left and right rear wheels 5L, 5R, e.g., the right rear wheel 5R, via the first power transmission system 10, and the ring gear is connected to the left rear wheel 5L via the second and third power transmission systems 11, 12. In this case, when the sun gear is rotated in normal or reverse direction of rotation relative to the carrier, the ring gear rotates in a direction opposite to that of the sun gear at a relative rotational speed of v/rp relative to the carrier, where V is the relative rotational speed of the sun gear relative to the carrier, and rp is the gear ratio between the ring gear and the sun gear (number of teeth of the ring gear/number of teeth of the sun gear). Therefore, the gear ratio between the driven gear 11b and the driving gear 11a of the second power transmission system 11 (number of teeth of the driven gear/number of teeth of the driving gear) is set to r1/rp, and the gear ratio between the entire second power transmission system 11 inclusive of the ring gear and the sun gear is set to r1. Similarly, the gear ratio between the driven gear 11c and the driving gear 11a of the third power transmission system 12 is also set to r1/rp.

The driving source 9 is constituted by an electric motor which contains therein a two-stage planetary gear type of reduction gear, and is controlled by a controller 14 via a driver circuit 15. Though not illustrated, the driver circuit 15 contains therein a conventional circuit for switching the rotation to normal or reverse direction and a regeneration brake circuit. By the way, it is also possible to constitute the driving source 9 by one which is other than the electric motor, e.g., a hydraulic motor.

The switching means 13 is constituted by a dog clutch which is provided on a gear shaft of the side gear 8b in a position between the driving gears 11a, 12a of both the second and third power transmission systems 11, 12 and which has an-axially movable dog member 13a. It is thus so arranged that the driving gears 11a, 12a of both the power transmission systems 11, 12 can be selectively coupled to the side gear 8b by moving the dog member 13a by means of a solenoid 13b to be controlled by the controller 14. By the way, it may also be so arranged that the driving gears 11a, 12a of both the second and third power transmission systems 11, 12 are directly coupled to the side gear 8b to thereby selectively couple the driven gears 11b, 12c of both the power transmission systems 11, 12 to the constant velocity joint 6a via the switching means 13. Further, it may also be so arranged that separate clutches made up of dog clutches, electromagnetic clutches, or the like are interposed in the second power transmission system 11 and the third power transmission system 12 to thereby selectively establish one of the corresponding power transmission systems by engaging one of both the clutches. However, in order to simplify the switching means 13, the illustrated example which uses one common dog clutch is appropriate.

To the controller 14 there are inputted signals of wheel speed sensors 16L, 16R which detect the speeds of the left and right front wheels 3L, 3R, wheel speed sensors 17L, 17R which detect the speeds of the left and right rear wheels 5L, 5R, a brake lamp switch 18, a side brake switch 19, a back light switch 20, and a steering angle sensor 21.

Figure 3:
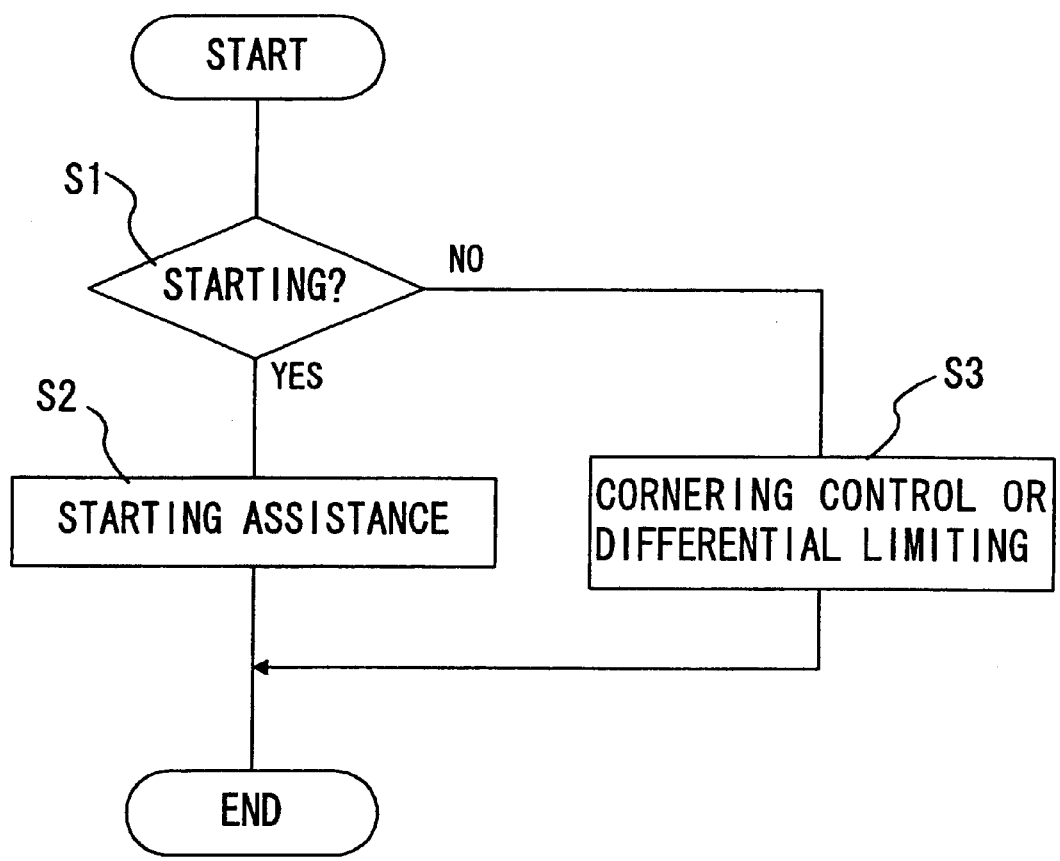
FIG. 3 is a flow chart showing a control program of the first embodiment.

The controller 14 receives a signal from a main controller (not illustrated) which controls the engine 1 and the transmission 2, and makes a determination as to whether or not the vehicle is in a starting operation or not (S1), performs a starting assistance control (S2) at the time of starting and, after starting, performs a cornering control and a differential limiting control (S3) as shown in FIG. 3,.

Figure 4:
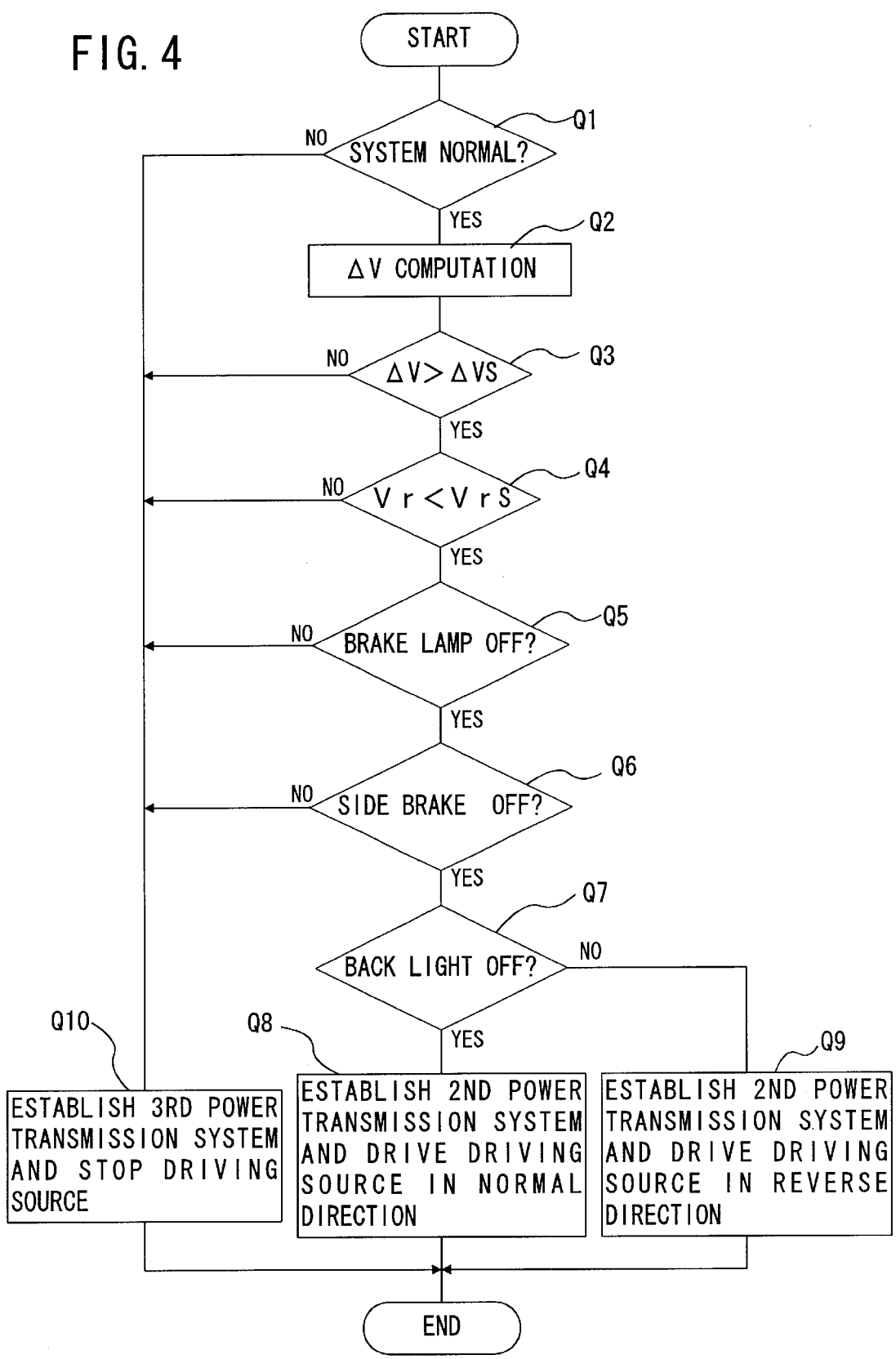
FIG. 4 is a flow chart showing a sub-routine for the starting assistance control.

Details of the starting assistance control are as a shown in FIG. 4. First, a determination is made as to the presence or absence of abnormality in the system (Q1). If there is no abnormality, a computation is made of the difference ΔV between the front wheel speed Vf and the rear wheel speed Vr (Q2), and a determination is made as to whether ΔV exceeds a set value ΔVS or not (Q3). It is when the front wheels as the driving wheels are slipping that the condition of ΔV>ΔVS is satisfied. In this case, the starting assistance becomes necessary until the rear wheel speed Vr, i.e., the vehicle speed exceeds a set value VrS (e.g., 15 km/h). On the other hand, when the brake is being applied, it is useless to perform the starting assistance. Therefore, when ΔV>ΔVS, a determination is then made as to whether the three conditions in that the rear wheel speed Vr is below VrS, that the brake lamp is OFF, and that the side brake switch is OFF are satisfied or not (Q4, Q5, Q6). When the three conditions are satisfied, a determination is made as to whether the back light is OFF or not (Q7). When the back light is OFF, namely, at the time of forward running, the second power transmission system 11 is established by the switching means 13 and also the driving source 9 is rotated in the normal direction (Q8). When the back light is ON, namely, at the time of reverse running, the second power transmission system 11 is established by the switching means 13 and also the driving source 9 is rotated in the reverse direction (Q9).

Here, once the second power transmission system 11 has been established, the left and right side gears 8b, 8c of the differential gear 8 will be coupled to the left and right rear wheels 5L, 5R at the mutually identical first gear ratio r1. When the differential gear case 8a of the differential gear 8 is rotated in the normal direction or in the reverse direction by the driving source 9, the driving force is equally transmitted to the left and right rear wheels 5L, 5R via the left and right side gears 8b, 8c to thereby perform the starting assistance in the forward or reverse running.

When there is an abnormality in the system or when the starting assistance is not required, namely, when ΔV≦ΔVS, or when Vr≧VrS, or when the brake lamp is ON, or when the side brake switch is ON, the third power transmission system 12 is established by the switching means 13 and also the driving source 9 is stopped (Q10).

After having started, while the switching means 13 is maintained in a state of establishing the third power transmission system 12, the driving source 9 is rotated in the normal or reverse direction at the time of cornering control. Namely, at the time of cornering to the left, the driving source 9 is rotated in the normal direction, and at the time of cornering to the right, the driving source 9 is rotated in the reverse direction. Here, in a state in which the third power transmission system 12 is established, the side gear 8b on the left side will be rotated in the direction opposite to that of the side gear 8c on the right side. When the left and right rear wheels 5L, 5R are rotating at the same speed at the time of forward running, the side gear 8b on the left side is rotated in the reverse direction at a speed equal to the rotational speed in the normal direction of the side gear 8c on the right side. Since the pinions 8d rotate on its own axis in a predetermined position, the differential gear case 8a does not rotate. If the differential gear case 8a is rotated in the normal direction in this state by the rotation in the normal direction of the driving source 9, the side gear 8c on the right side comes to be rotated via the pinions 8d in the normal direction at a speed higher than that of the side gear 8b on the left side. Further, if the differential gear case 8a is rotated in the reverse direction by the rotation in the reverse direction of the driving source 9, the side gear 8b on the left side comes to be rotated in the reverse direction via the pinions 8d at a speed higher than that of the side gear 8c on the right side. In this way, when the driving source 9 is rotated in the normal direction at the time of cornering to the left, the right rear wheel 5R is positively speeded up to thereby generate the difference rotation between the left and right rear wheels 5L, 5R. As a result, the driving force is added to the right rear wheel 5R which is the outer wheel and the braking force is added to the left rear wheel 5L which is the inner wheel. A yawing moment in the direction of cornering to the left is thus generated to thereby improve the left-cornering performance. If the driving source 9 is rotated in the reverse direction at the time of cornering to the right, the left rear wheel 5L which is the outer wheel is positively speeded up, resulting in an improvement in the right-cornering performance.

By the way, in performing the cornering control, a target cornering radius of the vehicle is computed from a vehicle speed and a steering angle, and the driving source 9 is controlled such that the value of the difference rotation between the left and right rear wheels 5L, 5R falls within this target cornering radius.

The differential limiting control is performed at the time of straight running or of cornering at a high speed by braking the driving source through the closure of. the regenerating brake circuit. According to this operation, the rotation of the differential gear case 8a is restricted and therefore the left and right side gears 8b, 8c come to be rotated at the same speed in the directions opposite to each other via the pinions 8d. Thus, the difference rotation between the left and right rear wheels 5L, 5R is limited by the braking force of the driving source 9. As a result, when a yawing moment is applied to the vehicle by disturbances or the like, a moment to resist it is generated and the stability in straight running and the stability in cornering at a high speed are improved.

By the way, when a difference rotation occurs between the left and right rear wheels 5L, 5R, the differential gear case 8a is rotated at a speed corresponding to the difference rotation to thereby drive, in inverse manner, the driving source 9. Therefore, if an excessive difference rotation is generated between the left and right rear wheels 5L, 5R due to locking of one of the wheels at the time of braking, or the like, the driving source 9 will be excessively rotated, resulting in a bad effect on durability.

Figure 5:
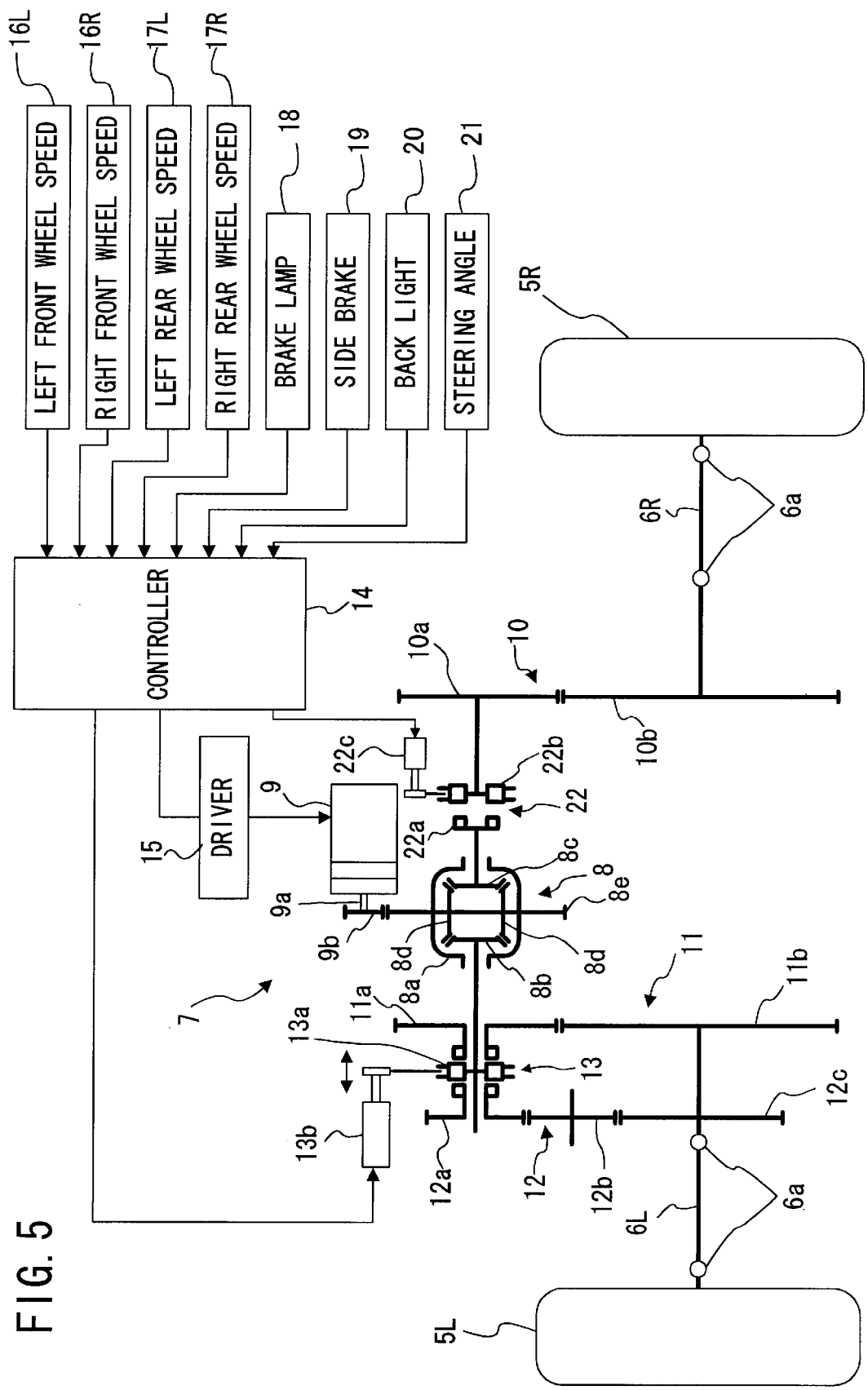
FIG. 5 is a skeleton diagram showing a second embodiment of the device of the present invention.

As a solution, in an example shown in FIG. 5, a clutch means 22 is interposed between the left and right rear wheels 5L, 5R, e.g., between the differential gear 8 and the first power transmission system 10. When the difference rotation between the left and right rear wheels 5L, 5R has exceeded a predetermined value, the clutch means 22 is disengaged to thereby release the coupling between the differential gear 8 and the first power transmission system 10. According to this arrangement, the driving, in inverse manner, of the driving source 9 due to the difference rotation between the left and right rear wheels 5L, 5R will no longer occur. The excessive rotation of the driving source 9 due to the excessive difference rotation is thereby prevented, and the durability of the driving source 9 is improved.

The clutch means 22 is constituted by a dog clutch comprising a stationary dog member 22a which is coupled to the side gear 8c of the differential gear 8, and a movable dog member 22b which is provided on the drive gear 10a of the first power transmission system 10 in a manner not relatively rotatable but is movable axially back and forth. The clutch means 22 is switched on and off by engaging the movable dog member 22b with, or disengaging it from, the stationary dog member 22a by a solenoid 22c which is controlled by the controller 14.

Figure 6:
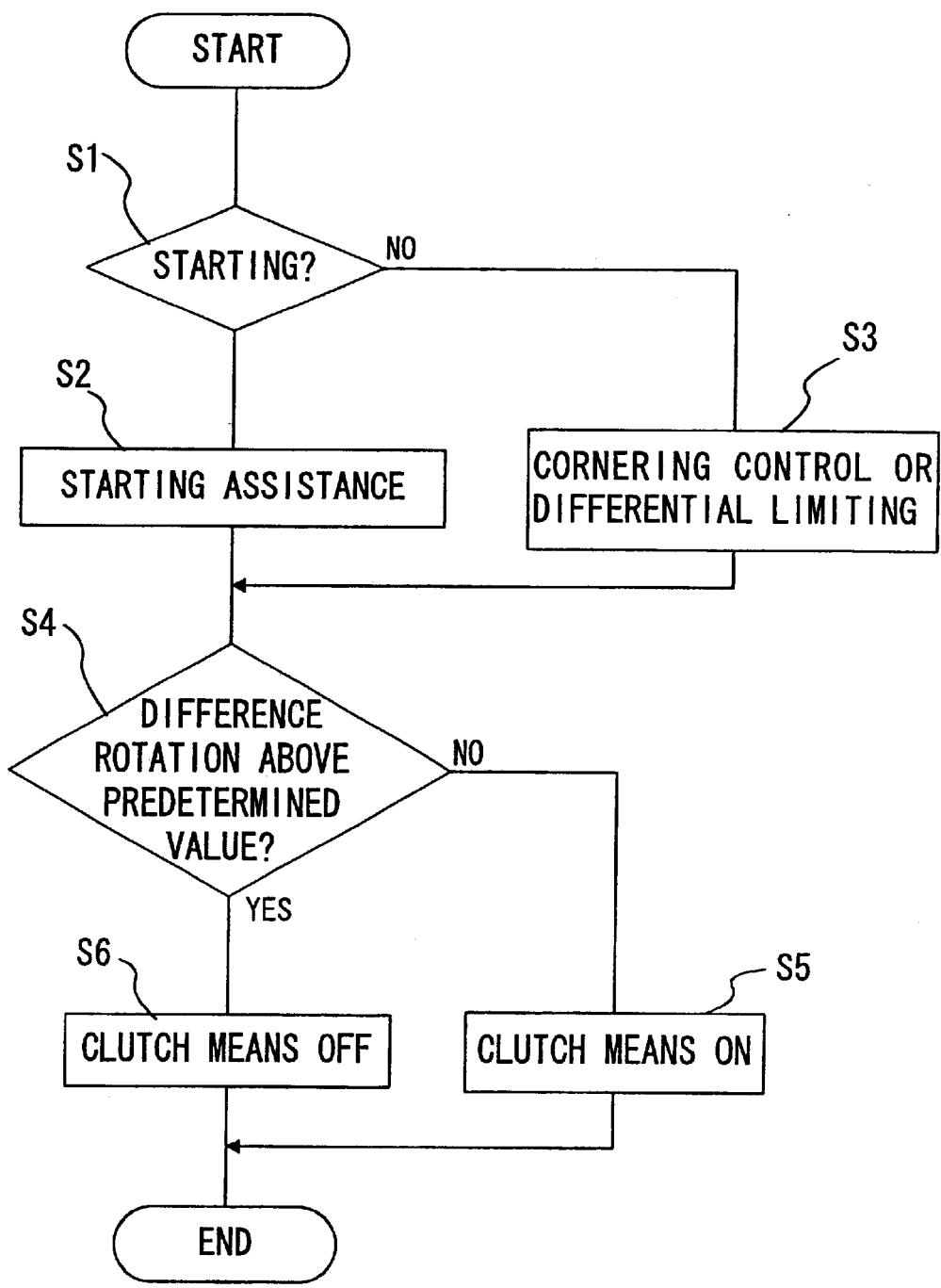
FIG. 6 is a flow chart showing a control program of the second embodiment.

As shown in FIG. 6, the controller 14 performs the starting assistance control, the cornering control, and the differential limiting control in a similar manner as described above (S1, S2, S3). Also, it makes a determination as to whether the difference rotation between the left and right rear wheels 5L, 5R has exceeded a predetermined value or not (S4). When the difference rotation is below the predetermined value, the clutch means 22 is switched on (S5). When the difference rotation is above the predetermined value, the clutch means 22 is switched off (S6).

Figure 7:
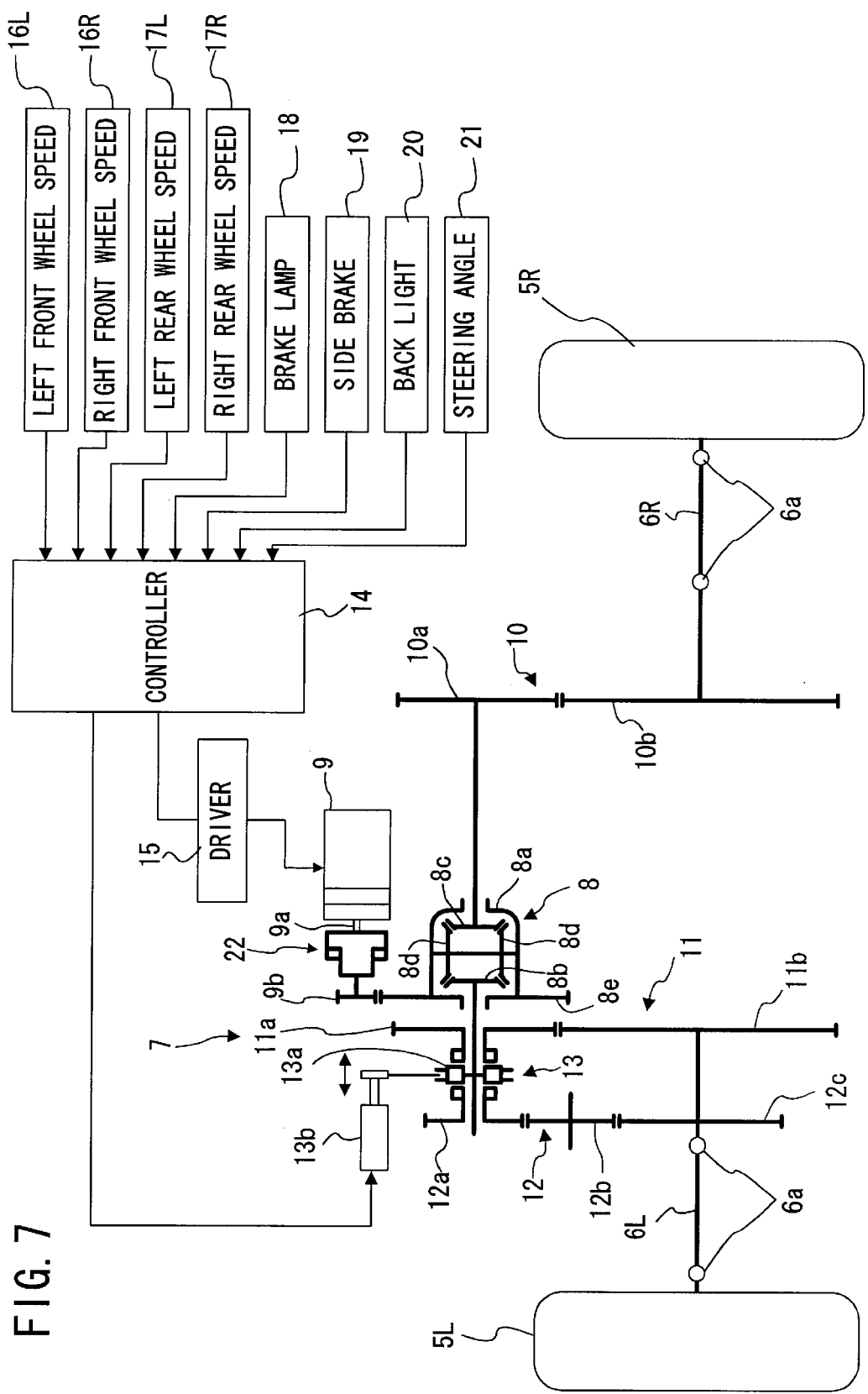
FIG. 7 is a skeleton diagram showing a third embodiment of the device of the present invention.

By the way, as the clutch means 22 an electromagnetic clutch or a hydraulic clutch may also be used. Further, the clutch means 22 may also be provided, as shown in FIG. 7, between the differential gear 8 and the driving source 9, e.g., on the output shaft 9a of the driving source 9. In this case, the clutch means 22 may be arranged to be switched on and off by the controller 14 in the same manner as in the above-described embodiment. However, during normal running, the driving source 9 is not driven in inverse manner unless a difference rotation is generated between the left and right rear wheels 5L, 5R. Therefore, an arrangement may also be made such that the clutch means 22 is constituted by a centrifugal clutch which is normally switched on, and that the clutch means 22 is switched off when the driving source 9 is driven in inverse manner at above a predetermined speed due to an excessive difference rotation between the left and right rear wheels 5L, 5R.

Further, the excessive rotation of the driving source 9 can also be prevented if the switching means 13 is arranged to be switchable to a neutral state in which neither of the second and third power transmission systems 11, 12 is established such that the switching means 13 is switched to the neutral state when the difference rotation between the left and right rear wheels 5L, 5R has exceeded a predetermined value. According to this arrangement, the clutch means 22 becomes needless and the construction can be-simplified.

Figure 8:
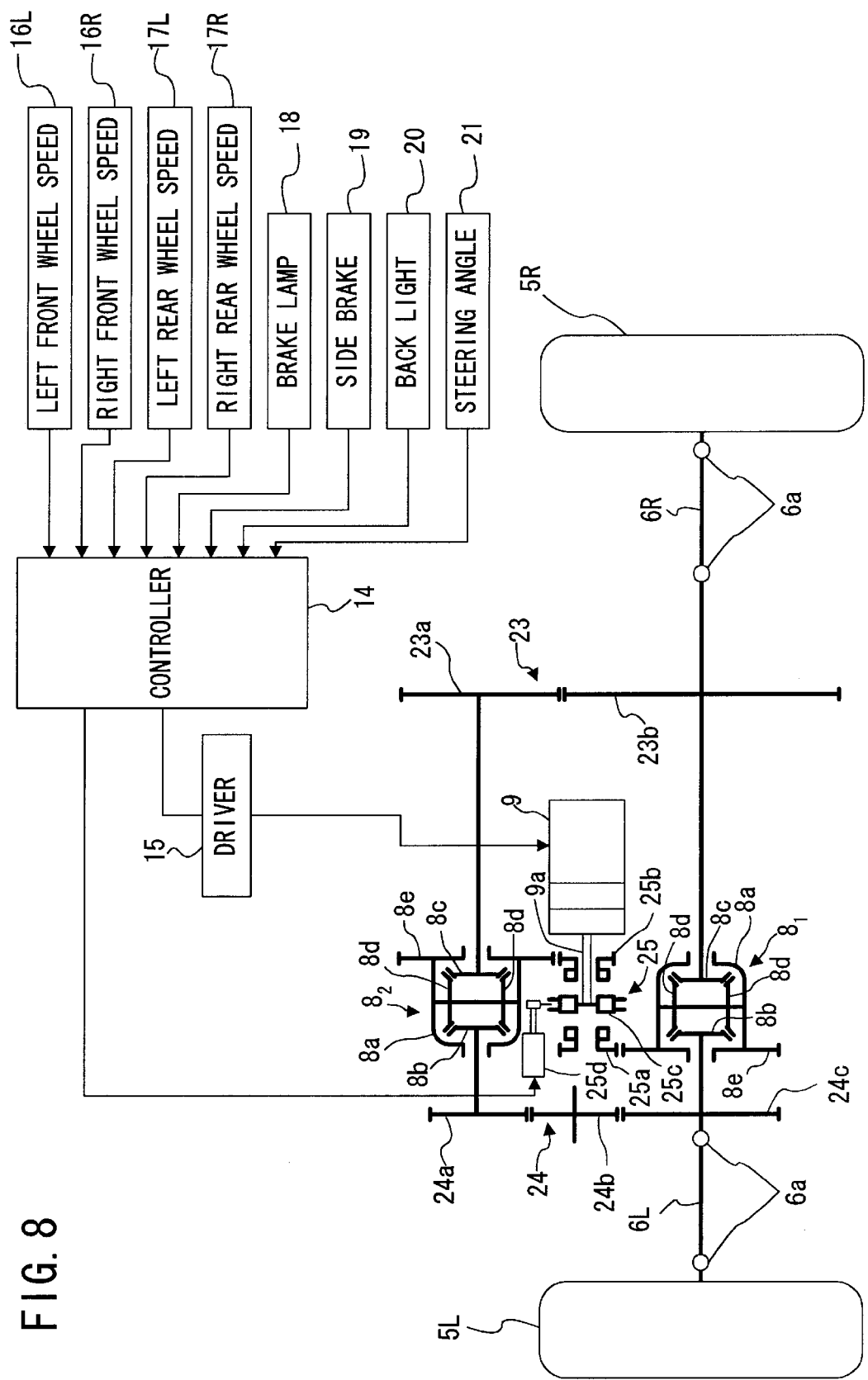
FIG. 8 is a skeleton diagram showing a fourth embodiment of the device of the present invention.

FIG. 8 shows still another embodiment. In this embodiment, there are provided a pair of first and second differential gears $8_1$, $8_2$. The left and right side gears 8b, 8c of the first differential gear $8_1$ are respectively coupled to the left and right rear wheels 5L, 5R at a mutually identical first gear ratio. And also one of the side gears of the second differential gear $8_2$, e.g., the side gear 8c on the right side, is coupled to the right rear wheel 5R atla second gear ratio, and the side gear 8b on the left side of the second differential gear $8_2$ is coupled to the left rear wheel 5L at a third gear ratio that is opposite in direction to, but is equal in absolute value to, the second gear ratio.

By the way, In the illustrated embodiment, each of the left and right side gears 8b, 8c of the first differential gear $8_1$ is directly coupled to the constant velocity joints on each of the coupling shafts 6L, 6R for each of the rear wheels 5L, 5R, and the above-described first gear ratio becomes "1." Further, the side gear 8c on the right side of the second differential gear $8_2$ is coupled to the constant velocity joints 6a on the coupling shaft 6R for the right rear wheel 5R via a gear train 23 which is made up of a driving gear 23a and a driven gear 23b. The above-described second gear ratio is the same as the gear ratio between the driving gear 23a and the driven gear 23b. The side gear 8b on the left side of the second differential gear $8_2$ is coupled to the constant velocity joint 6a on the coupling shaft 6L for the left rear wheel 5L via a gear train which is made up of a driving gear 24a, an intermediate idle gear 24b, and a driven gear 24c. The gear ratio between the driving gear 24a and the driven gear 24c is arranged to be equal to the gear ratio between the driving gear 23a and the driven gear 23b.

On the output side of the driving source 9, there is provided a switching means 25. This switching means 25 is constituted by that dog clutch provided on the output shaft 9a of the driving source 9 which comprises: a dog gear 25a which is engaged with a ring gear 8e fixed to the differential gear case 8a of the first differential gear $8_1$; a dog gear 25b which is engaged with a ring gear 8e fixed to the differential gear case 8a of the second differential gear $8_2$; and an axially movable dog member 25c which is selectively engaged with both the dog gears 25a, 25b. By moving the dog member 25c by a solenoid 25d to be controlled by the controller 14, the driving source 9 is arranged to be selectively coupled to the differential gear case 8a of each of the first and second differential gears $8_1$, $8_2$.

Then, by controlling the solenoid 25d with the controller 14, the driving source 9 is coupled, in performing the starting assistance control, to the differential gear case 8a of the first differential gear $8_1$. After starting, the driving source 9 is coupled to the differential gear case 8a of the second differential gear $8_2$. When the driving source 9 is coupled to the differential gear case 8a of the first differential gear $8_1$, there will be attained the same state as at the time of establishing the second power transmission system 11 in the above-described embodiment. Therefore, by rotating the driving source 9 in the normal direction or in the reverse direction, the driving power is equally transmitted to the left and right rear wheels 5L, 5R via the first differential gear $8_1$, whereby the starting assistance at the forward running or the reverse running is performed.

When the driving source 9 is coupled to the differential gear case 8a of the second differential gear $8_2$, there will be attained the same state as at the time of establishing the third power transmission system 12 in the above-described embodiment. Therefore, by rotating the driving source 9 to the normal direction at the time of cornering to the left, and by rotating the driving source 9 in the reverse direction at the time of cornering to the right, the rear wheel that becomes the outer wheel can be speeded up to thereby improve the cornering performance. Further, by braking the driving source 9 at the time of running straight or at the time of cornering at a high speed, the difference rotation between the left and right rear wheels 5L, 5R is limited, whereby the stability in running straight and the stability in cornering at a high speed can be improved.

Figure 9:
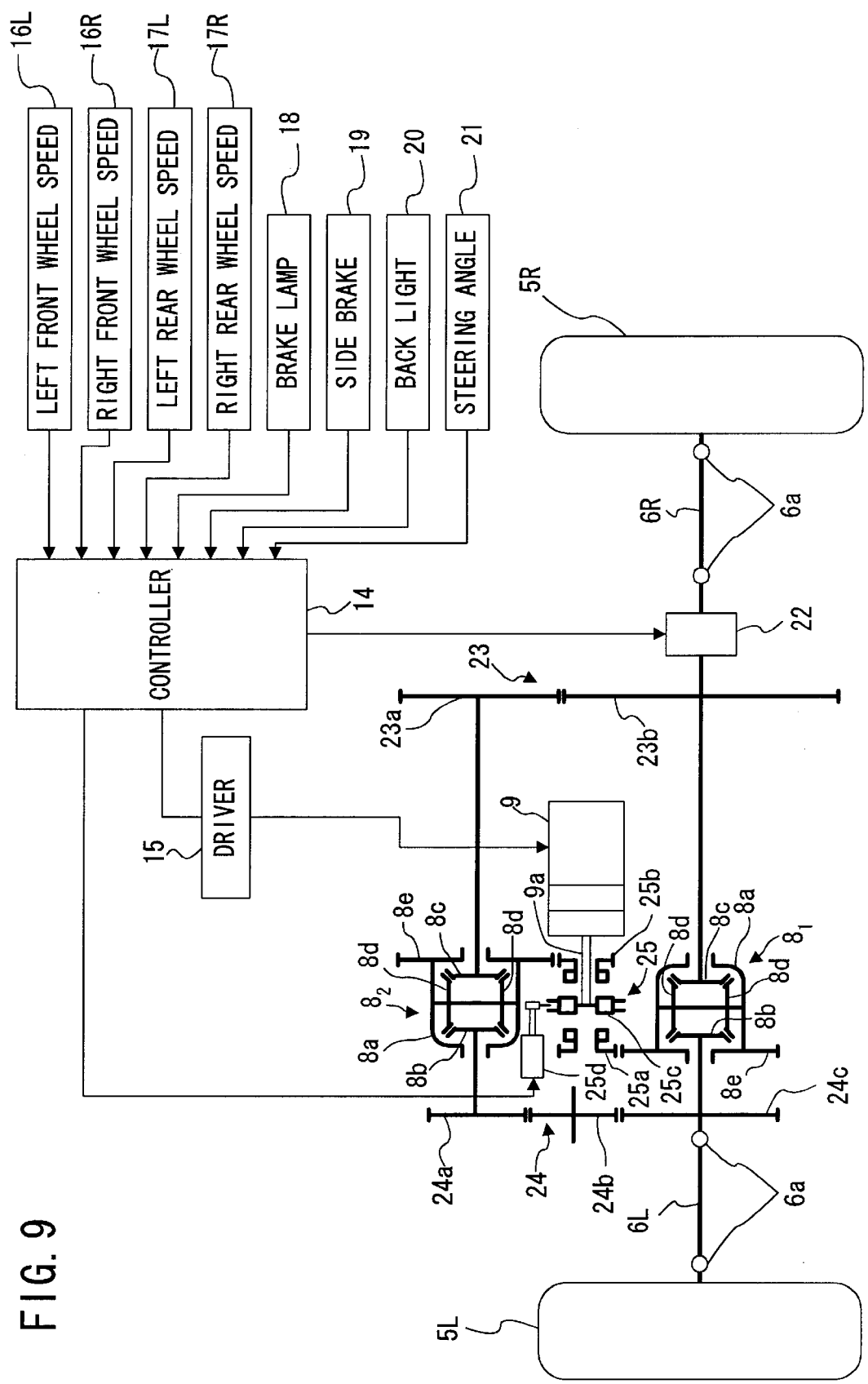
FIG. 9 is a skeleton diagram showing a fifth embodiment of the device of the present invention.

By the way, as shown in FIG. 9, if a clutch means 22 similar to the above-described one is interposed between the left and right rear wheels 5L, 5R so that the clutch means 22 is switched off when the difference rotation between the left and right rear wheels 5L, 5R has exceeded a predetermined value, an excessive rotation of the driving source 9 due to an excessive difference rotation can be prevented. Further, the excessive rotation of the driving source 9 due to the excessive difference rotation can also be prevented if there is provided a clutch means such as a centrifugal clutch or the like on the output shaft 9a of the driving source 9 so that the clutch means is switched off when the difference rotation has exceeded a predetermined value, thereby releasing the coupling between both the differential gears $8_1$, $8_2$ and the driving source 9. Further, if the switching means 25 is arranged to be switchable to a neutral state in which the driving source 9 is coupled to neither the differential gear case 8a of the first differential gear $8_1$ nor the differential gear case 8a of the second differential gear $8_2$, the excessive rotation of the driving source 9 due to the excessive difference rotation can be prevented by switching the switching means 25 to the neutral state when the difference rotation has exceeded a predetermined value, even if the clutch means 22 is not provided.

Figure 10:
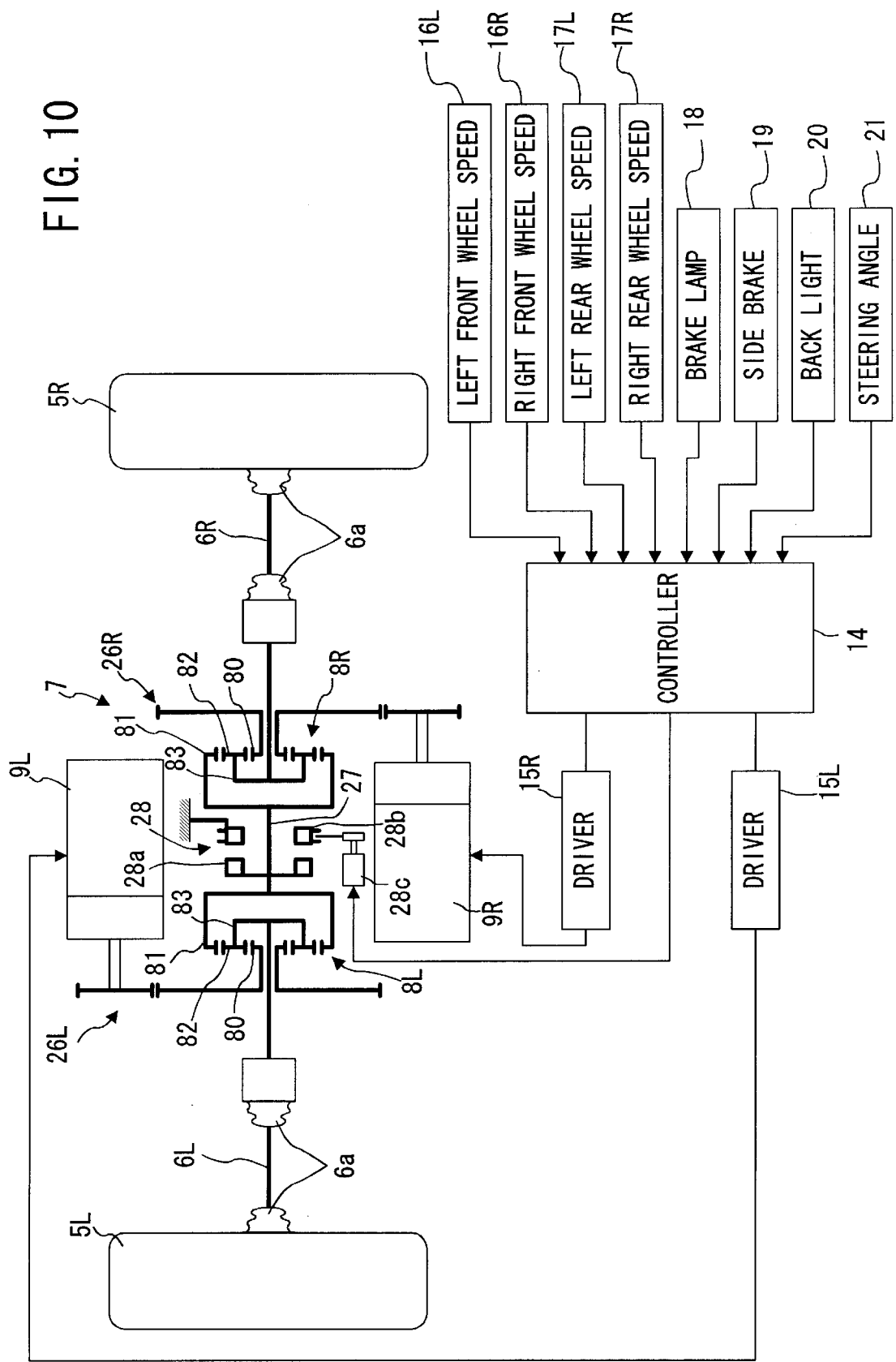
FIG. 10 is a skeleton diagram showing a sixth embodiment of the device of the present invention.

FIG. 10 shows still another embodiment. In this embodiment, the coupling device 7 is provided with a pair of left and right differential gears 8L, 8R, and a pair of driving sources 9L, 9R. Each of the differential gears 8L, 8R is constituted by a planetary gear type of differential gear which comprises a sun gear 80, a ring gear 81, and a carrier 83 for supporting a planetary gear 82 which is engaged with both the gears 80, 81. And each of the driving sources 9L, 9R is coupled to the sun gear 80 of each of the differential gears 8L, 8R in a speed-reduction manner via a reduction gear train 26L, 26R. Also the carrier 83 of each of the differential gears 8L, 8R is coupled to the constant velocity joint 6a on each of the coupling shafts 6L, 6R. Further, the ring gears 81 of both the differential gears 8L, 8R are coupled together via an intermediate shaft 27. By the way, the dimensions of the sun gears 80, of the ring gears 81, of the planetary gears 82, and of the carriers 83 of both the differential gears 8L, 8R are respectively made equal to each other.

Each of the driving sources 9L, 9R is constituted by a small electric motor and contains therein a planetary type of reduction gear. It is controlled by a controller 14 via respective driver circuits 15L, 15R. By the way, though not illustrated, each of the driver circuits 15L, 15R contains therein a conventional switching circuit for switching the rotational direction between normal direction and reverse direction, and a regeneration brake circuit. It is also possible to constitute the driving sources 9L, 9R by ones other than electric motors, e.g., by hydraulic motors.

The coupling device 7 is further provided with a brake means 28 for restricting the rotation of the ring gears 81 of both the differential gears 8L, 8R. The brake means 28 is constituted by a dog clutch which comprises a stationary dog member 28a which is fixed to an intermediate shaft 27, and a movable dog member 28b which is prevented from rotating relative to the casing of the coupling device 7 and which is movable axially back and forth. The movable dog member 28b is moved back and forth by a solenoid 28c to be controlled by the controller 14 to thereby engage it with, and disengage it from, the stationary dog member 28a, whereby the restriction and releasing of the ring gears 81 are performed. It is also possible to constitute the brake means 28 by a hydraulic clutch or an electromagnetic clutch which is disposed on the casing in a relatively non-rotatable manner.

In performing the starting assistance control, the brake means 28 is switched on by engaging the movable dog member 28b with the stationary dog member 28a, and also both the driving sources 9L, 9R are rotated in the normal direction (at the time of forward running) or in the reverse direction (at the time of reverse running).

Here, when the brake means 28 is switched on, the ring gears 81 of both the differential gears 8L, 8R are restricted, whereby the ring gears 81 function as reaction force receiving members. When the sun gears 80 of both the driving sources 9L, 9R are rotated in the normal or reverse direction, the carrier 83 is rotated in the normal or reverse direction in a speed-reduced state. A required driving torque is thus transmitted to the left and right rear wheels 5L, 5R to thereby perform the starting assistance.

When the system is in disorder or when the starting assistance is not required, the brake means 28 is switched off and also both the driving sources 9L, 9R are stopped.

After starting, while the brake means 28 is kept in a switched-off state, both the driving sources 9L, 9R are rotated in the normal or reverse direction in performing the cornering control. In more detail, the cornering control is performed, e.g., at the time of cornering to the right, by rotating the driving source 9L in the normal direction and by rotating the driving source 9R in the reverse direction. When the driving source 9L is rotated in the normal direction, the carrier 83 of the sun gear 80 of the differential gear BL is rotated in the normal direction relative to the ring gear 81 due to the rotation in the normal direction of the sun gear 80 of the driving source 9L. Further, when the driving source 9R is rotated in the reverse direction, the carrier 83 of the sun gear 80 of the differential gear 8R is rotated in the reverse direction relative to the ring gear 81 due to the rotation in the reverse direction of the sun gear 80 of the driving source 9R. In this case, a reaction force in the reverse direction is operated on the ring gear 81 of the differential gear 8L, and a reaction force in the normal direction is operated on the ring gear 81 of the differential gear 8R. However, since both the ring gears 81, 81 are coupled to each other, both the reaction forces are mutually canceled. Accordingly, on the basis of the rotational speeds of both the ring gears 81, 81, the carrier 83 of the differential gear 8L, i.e., the left rear wheel 5L, is speeded up and the carrier 83 of the differential gear 8R, i.e., the right rear wheel 5R, is retarded. As a result, there occurs a difference rotation between the left and right rear wheels 5L, 5R. And a driving force is added to the left rear wheel 5L which is the outer wheel, and a braking force is added to the right rear wheel 5R which is the inner wheel, whereby a yawing moment in the direction of right cornering is generated, resulting in an improvement in the right cornering performance.

Further, since the dimensions of the corresponding rotational elements, such as of the sun gears 80 and of the ring gears 81 of both the differential gears 8L, 8R, are the same, the amount of speeding up of the left rear wheel 5L and the amount of retardation of the right rear wheel 5R become equal to each other if the absolute values of rotational speeds of both the driving sources 9L, 9R are made equal to each other. The average speeds of the left and right rear wheels 5L, 5R thus become equal to the speed of the vehicle, whereby the slip of the wheels due to the difference rotation between the front and rear wheels can be prevented. And in order to make equal to each other the absolute values of the rotational speeds of both the driving sources 9L, 9R, it is enough to make equal the absolute values of the electric current values to be charged to both the driving sources 9L, 9R. The control of the driving sources 9L, 9R therefore becomes easy.

At the time of cornering to the left, the left rear wheel 5L, which is the inner wheel, is retarded by rotating the driving source 9L in the reverse direction, and the right rear wheel 5R, which is the outer wheel, is speeded up by rotating the driving source 9R in the normal direction.

By the way, at the time of cornering control, a target cornering radius of the vehicle is computed from the vehicle speed and the steering angle, and then both the driving sources 9L, 9R are controlled such that the value of the difference rotation between the left and right rear wheels 5L, 5R becomes a value which fits to this target cornering radius.

The differential limiting control is made, at the time of running straight or cornering at a high speed, by braking both the driving sources 9L, 9R through closure of the regeneration brake circuit. According to these operations, the sun gears 80 of both the differential gears 8L, 8R function as reaction force receivers. The rotation of the left rear wheel 5L is thus transmitted to the ring gear 81 of the differential gear BL via its carrier 83, and also the rotation of the right rear wheel 5R is transmitted to the ring gear 81 of the differential gear 8R via its carrier 83. And, since both the ring gears 81, 81 are coupled to each other, the difference rotation between the left and right rear wheels 5L, 5R is restricted by the braking force of both the driving sources 9L, 9R. As a result, when the yawing moment is added to the vehicle due to disturbances or the like, a moment to resist the yawing moment occurs, whereby the stability of running straight and the stability of cornering at a high speed are improved.

By the way, if an excessive difference rotation occurs between the left and right rear wheels 5L, 5R due to locking of one wheel at the time of braking, or the like, both the driving sources 9L, 9R are driven in inverse manner in the normal direction and in the opposite direction, respectively, at an excessive speed due to a function which is opposite to that at the time of cornering control. A bad effect will thus be given to the durability of the driving sources 9L, 9R.

Figure 11:
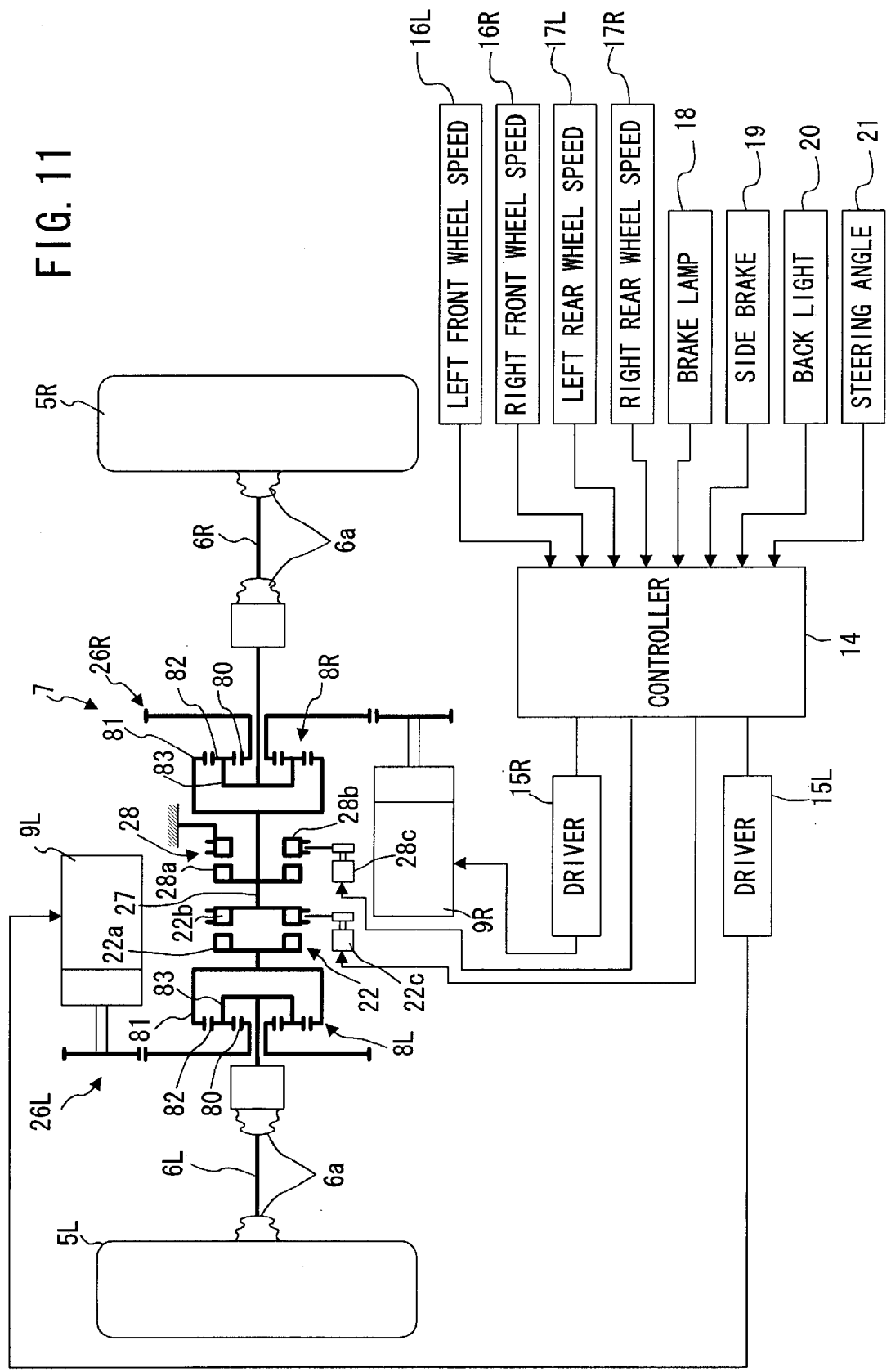
FIG. 11 is a skeleton diagram showing a seventh embodiment of the device of the present invention.

As a solution, in an embodiment shown in FIG. 11, an intermediate shaft 27 to couple the ring gears 81 of both the driving sources 8L, 8R is divided, and a clutch means 22 is provided in the divided portion. Both the differential gears 8L, 8R are thus coupled via the clutch means 22 so that, when the difference rotation between both the left and right rear wheels 5L, 5R has exceeded a predetermined value, the clutch means 22 is switched off to thereby release the coupling between both the differential gears 8L, 8R. According to this arrangement, the driving in inverse manner of both the driving sources 9L, 9R due to the difference rotation between the left and right rear wheels 5L, 5R will no longer occur. An excessive rotation of both the driving sources 9L, 9R due to the excessive difference rotation is prevented, and the durability of both the driving sources 9L, 9R is improved.

In this embodiment, the clutch means 22 is constituted by a dog clutch comprising a stationary dog member 22a which is fixed to one half of the divided intermediate shaft 27, and a movable dog member 22b which is provided on the other half of the intermediate shaft 27 so as to be relatively non-rotatable but be axially movable back and forth. The clutch means 22 is switched on and off by engaging the movable dog member 22b with, or disengaging it from, the stationary dog member 22a by means of a solenoid 22c to be controlled by the controller 14.

As the clutch means 22, an electromagnetic clutch or a hydraulic clutch may also be used. Further, in the embodiment shown in FIG. 11, the clutch means 22 is interposed between both the deferential gears 8L, BR. However, it may also be interposed between one of the deferential gears and the corresponding one of the rear wheels, e.g., between the differential gear 8L and the constant velocity joint 6a on the coupling shaft 6L for the left rear wheel 5L. What is important is that it may be interposed in a position in which the coupling between the left and right rear wheels 5L, 5R can be released.

Further, also when the coupling between at least one of the differential gears and the corresponding one of the driving sources is released, there will neither occur the driving in inverse manner of both the driving sources 9L, 9R due to the difference rotation between the left and right rear wheels 5L, 5R. Therefore, as shown in FIG. 12, the clutch means 22 may also be interposed between the sun gear 80 of one of the differential gears, e.g., the differential gear 8L, and the driving source 9L. In this case, the clutch means 22 may be made of a type to be controlled for switching on and off by the controller 14 like in the above-described one. However, since the sun gear 80 of each of the differential gears 8L, 8R does not rotate, during normal running, unless a difference rotation occurs between the left and right rear wheels 5L, 5R, the clutch means 22 may be constituted by a centrifugal clutch which is normally kept switched on such that the clutch means 22 is switched off when the sun gear 80 rotates at above a predetermined rotational speed due to an excessive difference rotation between the left and right rear wheels 5L, 5R.

An explanation has so far been made about embodiments in which the present invention is applied to the connecting device between rear wheels of the front-wheel-drive vehicle. The present invention can, however, also be similarly applied to the coupling device between front wheels of a rear-wheel-drive vehicle.

What is claimed is:

1. A coupling device between left and right wheels of a vehicle, said coupling device being provided between the left and right wheels of the vehicle, comprising:

a pair of first and second differential gears each having a first rotational element, and second and third rotational elements one of which rotates in normal direction while the other thereof rotates in reverse direction, respectively, relative to said first rotational element;

a driving source which is selectively coupled via switching means to said first rotational element of said first differential gear and to said first rotational element of said second differential gear;

wherein said second rotational element and said third rotational element of said first differential gear are coupled at a first gear ratio to one and the other, respectively, of the left and right wheels;

wherein said second rotational element of said second differential gear is coupled to one of the left and right wheels at a second gear ratio; and wherein said third rotational element of said second differential gear is coupled to said the other of the left, and right wheels at a third gear ratio which is different from said second gear ratio.

2. A coupling device between left and right wheels of a vehicle according to claim 1, wherein said third gear ratio is opposite in direction to, but is equal in absolute value to, said second gear ratio.

3. A coupling device between left and right wheels of a vehicle according to claim 2, further comprising clutch means which releases the coupling between the left and right wheels or the coupling between both said differential gears and said driving source when a difference rotation between said left and right wheels has exceeded a predetermined value.

4. A coupling device between left and right wheels of a vehicle according to claim 2, wherein said switching means is arranged to be switchable to a neutral state in which said driving source is coupled to neither of said first rotational element of one of said differential gears and said first rotational element of the other of said differential gears such that said switching means is switched to the neutral state when the difference rotation between the left and right wheels has exceeded a predetermined value.

5. A coupling device between left and right wheels of a vehicle according to claim 1, further comprising clutch means which releases the coupling between the left and right wheels or the coupling between both said differential gears and said driving source when a difference rotation between said left and right wheels has exceeded a predetermined value.

6. A coupling device between left and right wheels of a vehicle according to claim 1, wherein said switching means is arranged to be switchable to a neutral state in which said driving source is coupled to neither of said first rotational element of one of said differential gears and said first rotational element of the other of said differential gears such that said switching means is switched to the neutral state when the difference rotation between the left and right wheels has exceeded a predetermined value.

* * * * *